Patented Mar. 19, 1940

2,194,392

UNITED STATES PATENT OFFICE 2,194,392

METHOD OF PACKING AND STORING CARBON BLACK

Cecil G. Keeton, deceased, late of Independence, Mo., by Lillian Keeton, administratrix, Independence, Mo., assignor to Danciger Oil and Refineries, Inc., Tulsa, Okla.

No Drawing. Original application April 17, 1934, Serial No. 721,062. Divided and this application September 26, 1938, Serial No. 231,848

2 Claims. (Cl. 23—239)

This invention relates to new and useful improvements in a method of storing or packing carbon black for the market, and although the method may be employed with the carbon black produced by any suitable process, it is primarily intended for use with carbon black produced by the method covered by application Serial No. 721,062, filed April 17, 1934, patented October 25, 1938, as Patent No. 2,134,228, of which the present application is a division.

It is the object of this invention to pack or store carbon black at its source of production in a receptacle wherein an atmosphere substantially free from air or moisture has been established, and to this end, receptacles for this material are substantially filled with an inert substance such, for example, as carbon dioxide prior to the introduction of the carbon black. This not only prevents the quality of the carbon black from deteriorating but has also been found to improve such quality.

The process disclosed in this patent consists of the production of uncontaminated carbon black by the incomplete combustion of natural gas, the removal of the carbon black from the combustion chambers with the other products of combustion, and separation of these in a series of separators from which the solid dried carbon black is removed and packed without being contacted with air, said carbon black being continuously surrounded with products of combustion until it is packed.

In carrying out the process of the present invention, dried carbon black from the final separator of the process described in the aforesaid patent is introduced into a receptacle which has been subjected to a stream of carbon dioxide for several minutes, until it is assured that all of the air in said receptacle has been displaced by the gas. Preferably the carbon dioxide gas is fed from a cylinder containing compressed carbon dioxide.

Without interrupting the stream of carbon dioxide, the dried carbon black is fed into the receptacle through a tube which is quickly withdrawn when the receptacle is filled, after which said receptacle is closed and sealed in any suitable manner, so as to avoid the displacement of the atmosphere of carbon dioxide with air.

Heretofore, it has been the usual procedure to pack carbon black in containers under conditions such that it has been in contact with atmospheric air. As atmospheric air contains oxygen and moisture, it has been found that this has a deleterious effect on the carbon black and in turn on the rubber composition with which this product is largely used for incorporation.

In order to illustrate the advantages of the present invention over packing methods heretofore employed, a comparative test was conducted. This consisted in drying about 400 grams of carbon black produced in accordance with the process of the aforesaid patent at a temperature of 110° C. for 18 hours, employing an electric furnace for the drying operation. One-half of this dried carbon black was introduced to a warmed short-neck glass bottle of one quart capacity which was corked and sealed with molten paraffin.

Another bottle, similar to that already described, was subjected to a stream of carbon dioxide introduced therein by means of a glass tube connected to a cylinder containing compressed carbon dioxide. The compressed gas was allowed to flow for several minutes until it was assured that all of the air had been displaced by the gas. Then, without interrupting the stream of carbon dioxide, the remaining half of the dried carbon black was introduced into this bottle, the tube being quickly withdrawn and the bottle corked and sealed with molten paraffin with such rapidity that substantially none of the carbon dioxide was replaced by air.

Rubber mixes were then prepared incorporating the two samples of carbon black, both samples being incorporated with the same master batch of rubber, and tests were made to note the physical properties of each sample. These tests showed that the rubber mix incorporating the carbon black portion which had been packed in an atmosphere of carbon dioxide possessed marked improvement in quality over that which had been packed in the conventional manner, in that it possessed a greater tensile strength and remarkably increased dispersion qualities.

From the foregoing, it is believed that this invention may be readily understood by those skilled in the art without further description, it being borne in mind that changes may be made in the details disclosed without departing from the spirit of the invention as set forth in the following claims.

It is claimed:

1. A method of preparing for packing and storage, carbon black produced under conditions excluding contact with oxygen, which comprises introducing said carbon black directly into receptacles wherein there is maintained an atmosphere of carbon dioxide.

2. A method of preparing for packing and storage, carbon black produced by incomplete combustion of hydrocarbon gas and wherein the product is maintained continuously in an atmosphere of combustion gas; the steps which comprise introducing into a receptacle a stream of carbon dioxide to displace atmospheric air and moisture, then, without interrupting said stream, introducing carbon black in said receptacle directly from production, and sealing said receptacle.

LILLIAN KEETON,
*Administratrix of Estate of Cecil G. Keeton, Deceased.*